United States Patent [19]

Forsman

[11] 4,296,975
[45] Oct. 27, 1981

[54] DEVICE FOR TRANSMITTING LINEAR MEASURING MOTION

[76] Inventor: Lars Ö. Forsman, Helsingborg, Sweden

[21] Appl. No.: 118,802

[22] PCT Filed: Nov. 13, 1978

[86] PCT No.: PCT/SE78/00076
§ 371 Date: Jul. 10, 1979
§ 102(e) Date: Jul. 10, 1979

[87] PCT Pub. No.: WO79/00292
PCT Pub. Date: May 31, 1979

[30] Foreign Application Priority Data

Nov. 14, 1977 [SE] Sweden .................................. 7712828

[51] Int. Cl.³ ............................................. F16C 29/04
[52] U.S. Cl. ................................................ 308/6 R
[58] Field of Search .............. 308/3 A, 4 R, 6 R, 6 B, 308/6 C

[56] References Cited

U.S. PATENT DOCUMENTS

| | | | |
|---|---|---|---|
| 2,518,102 | 8/1950 | Ward | 308/6 R |
| 3,208,151 | 9/1965 | Rawstron | 33/174 P |
| 3,563,617 | 2/1971 | Pritchard | 308/6 R |
| 3,624,910 | 12/1971 | Farrand | 308/6 R |
| 4,197,652 | 4/1980 | Quernell et al. | 308/4 R |

FOREIGN PATENT DOCUMENTS 2043918 3/1972 Fed. Rep. of Germany ..... 308/3 A
2520070 11/1976 Fed. Rep. of Germany ..... 308/6 R

*Primary Examiner*—Richard R. Stearns
*Attorney, Agent, or Firm*—Berman, Aisenberg & Platt

[57] ABSTRACT

A device for transmitting linear measuring motion comprises a U-shaped element and a T-shaped element, the stem of which is received between the limbs of the U-shaped element. The elements are connected for relative axial displacement and rotational motion by means of a ball bearing. Rotational motion is prevented by an anti-friction bearing between the elements. The elements are biased against each other over the anti-friction bearing accurately guiding the elements for relative axial displacement thereof.

7 Claims, 10 Drawing Figures

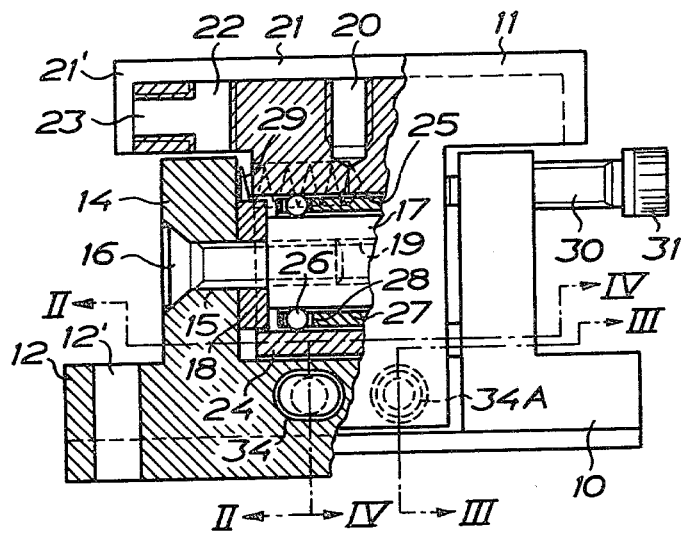
FIG. 1
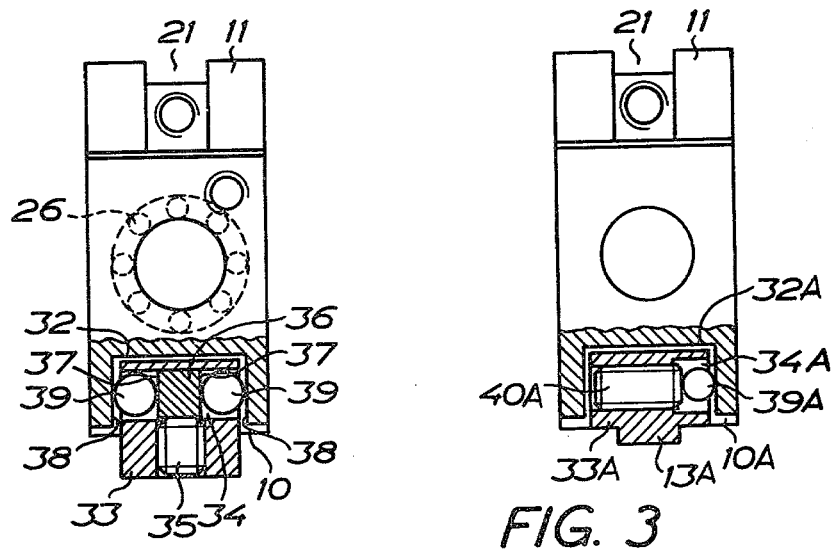
FIG. 2
FIG. 3
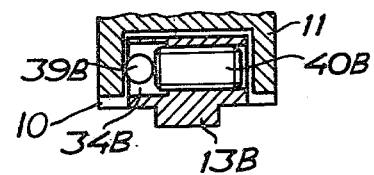
FIG. 4

DEVICE FOR TRANSMITTING LINEAR MEASURING MOTION

The invention relates to a device for transmitting linear measuring motion, comprising two relatively displaceable elements, one of which is U-shaped and the other one of which is T-shaped, the stem of said latter element being received between the limbs of the U-shaped element. Devices of this type are used in apparatuses for measuring the dimensions of products in order to check that the dimensions fall within acceptable ranges according to prescribed standards.

The purpose of the invention is to provide an accurate device of this kind, which is free from play in the transverse direction of the movement while the friction-free movement aimed at by the device is retained.

For this purpose the invention provides a device of the kind referred to above which is characterized in that a body is fixedly connected to one element and is received in a through cylindrical opening in the other element which is mounted on the cylindrical body by means of a ball bearing allowing relative axial motion as well as rotational motion of the elements, and in that the elements are biased against each other over at least one anti-friction member arranged between axial races on the elements and preventing relative rotation of the elements to accurately guide the elements for relative axial displacement thereof.

In order to elucidate the invention embodiments thereof will be described in more detail in the following, reference being made to the accompanying drawings in which FIG. 1 is a side view, partly a vertical cross-sectional view, of one embodiment of the device according to the invention;

FIG. 2 is an end view of the device as seen from the left in FIG. 1, partly a cross-sectional view along line II—II in FIG. 1, illustrating one embodiment of the anti-friction bearing;

FIG. 3 is an end view from the right in FIG. 1, partly in cross-sectional view along line III—III in FIG. 1, illustrating another embodiment of the anti-friction bearing;

FIG. 4 is a cross-sectional view along line IV—IV in FIG. 1 of the embodiment of the anti-friction bearing shown in FIG. 2;

Figure 5:
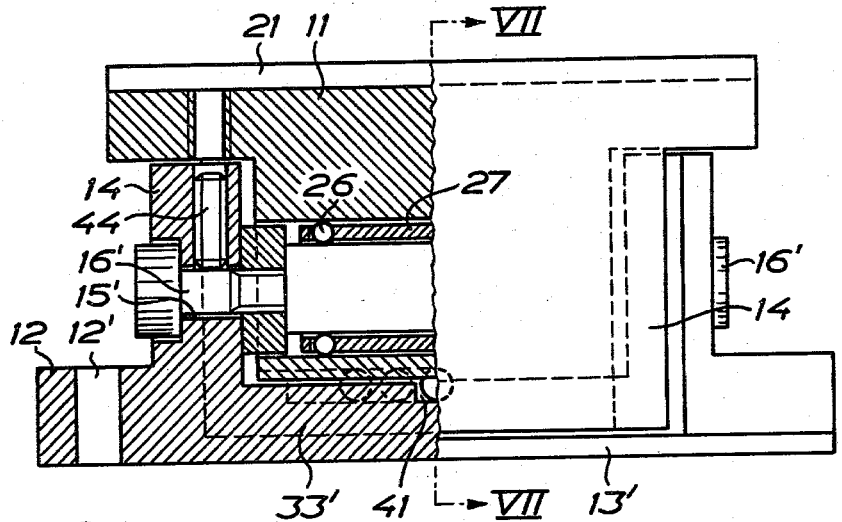
FIG. 5 is a side view, partly a vertical cross-sectional view, of a second embodiment of the device.

The device for transmitting linear measuring motion shown in FIGS. 1 and 2 comprises two relatively movable elements, a U-shaped element 10 and a T-shaped element 11. The element 10 has flanges 12 with through bores 12' for securing the element by screws for example on a part of a measuring apparatus and has a longitudinal guide rib 13 on the lower side thereof for engagement with the part to which the element is to be secured. A countersunk through bore 15 is provided in one of the two limbs 14 of the element 10, and a cylindrical body 17 is secured to this limb by means of a screw 16 having a countersunk head. A washer 18 having a diameter which is larger than that of the cylindrical body 17 is interposed between the body and the limb. The screw 16 is screwed into a threaded central bore 19 extending throughout the cylindrical body 17. This body is secured also to the other limb 14 in the same manner as that just described.

The other element 11 has a threaded bottom hole 20 for fixedly connecting said element, for example to another part of the measuring apparatus, and this element is formed with a guide groove 21 which extends along the element 11 and also continues downwards along the ends of the element at 21'. Furthermore, there are provided in the element 11 two mutually perpendicular threaded bores 22 and 23 for connecting members such as measuring arms and abutments of different kinds to the element 11. The groove 21, 21' can serve as a guide for these measuring arms so that they are held accurately orientated on the element 11.

The stem 24 of the element 11 forms a cylindrical bore 25 extending transversely through the stem, and the cylindrical body 17 and partly also the washers 18 connected to the element 10 as described above are received in this bore. Between the cylindrical outside surface of the body 17 and the cylindrical inside surface of the bore 25 there are arranged an annular set of balls 26 at one end of the body 17 and a corresponding annular set of balls at the opposite end of the body. These balls are held in position by means of a ball cage 27 formed as a cylindrical sleeve with openings 28 for receiving the balls therein. In this way the element 11 is rotatably and also axially displaceably journalled on the body 17 connected to the element 10, the fit between the body 17 and the bore 25 being such that the balls are always engaging both elements to provide a clearance-free connection therebetween.

A helical pressure spring 29 is mounted between the elements 10 and 11 said spring being received by bores in one limb 14 of the element 10 and in the stem 24 of the element 11, respectively, and accordingly the element 11 is yieldably biased to the right in relation to the element 10 as seen in FIG. 1. A set screw 30 having a head 31 formed with a hexagonal socket is screwed into the other limb 14 of the element 10, and the extent of relative movement of the elements 10 and 11 can be controlled by adjustment of this set screw.

The ball bearing provided between the two elements 10 and 11 by means of the balls 26 as described above allows axial movement between the elements as well as relative rotation therebetween but since the device is intended to transmit linear motion only, no rotation should of course be permitted between the elements. In order to prevent such relative rotation of the elements 10 and 11, a rectangular channel or recess 32 is formed in the lower end of the stem of the element 11, and the web 33 of the element 10 is partly received in said recess, a gap being arranged around the web 33, as will be seen from FIG. 2. A bore 34 extends transversely through the web, and this bore is of elongated oval cross-sectional form in the longitudinal direction of the web 33, as will be seen in FIG. 1. A hardened body 36 is fixedly clamped centrally in the bore 34 by means of a mounting screw 35, said body having face-ground surfaces 37. Balls 39 are engaged between these surfaces and plane surfaces 38 on the straddling element 11 opposite to the ends of the bore 34. Thus, the balls 39 can roll freely along the surfaces 37 and 38 when the elements 10 and 11 are displaced in relation to each other along the body 17, but the balls prevent rotation of the elements relative to each other about the centre axis of the body 17. The elements are guided in this way only by rolling friction.

Instead of two balls 39 being arranged in a common opening 34, as shown in FIG. 2, balls 39B can be arranged at one side only in the bore 34B, as shown in FIG. 4, and at the other side in a bore 34A parallel with the bore 34, as shown in FIG. 3. The balls are engaged by a hardened screw 40 having a face-ground end set against the ball.

Figure 6:
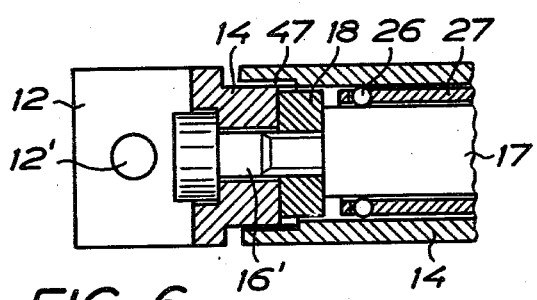
FIG. 6 is a fragmentary horizontal cross-sectional view of the device shown in FIG. 5.
Figure 7:
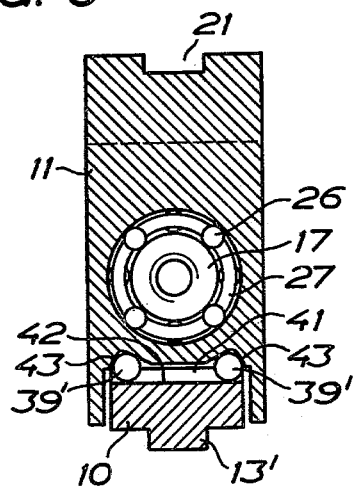
FIG. 7 is a cross-sectional view along line VII—VII in FIG. 5.

In the embodiment according to FIGS. 5 to 7, the screw 16 having a countersunk head according to FIGS. 1 and 2 is replaced by a screw 16', the head of which is cylindrical and formed with a hexagonal socket. This screw and the head thereof are received in a countersunk clearance hole 15' wherein the screw has a limited play in the transverse direction thereof.

In the embodiment according to FIGS. 5 to 7, the anti-friction bearing for preventing rotation of the elements 10 and 11 in relation to each other is arranged to another manner than that disclosed in FIGS. 1 to 4. In this case a transverse recess 41 having a plane bottom surface 42 is arranged in the web 33' of the element 10, and the recess 32 in the element 11 has two V-shaped grooves 43 in the bottom surface which is opposite to the plane bottom surface 42 of the recess 41. The balls 39' are received in these grooves and can roll against the two flanks thereof and against the plane surface 42 when the elements 10 and 11 are displaced in relation to each other. However, the balls prevent relative rotational movement of the elements about the centre axis of the body 17. The recess 41 extends as far in the longitudinal direction of the elements as is necessary for the desired linear relative movement between the elements 10 and 11.

In order to make the anti-friction bearing provided by the balls 39' in FIGS. 5 to 7 free from clearance the T-formed element 11 can be clamped towards the web 33' of the element 10 by means of a set screw 44 in each of the limbs 14 of the element 10, this set screw acting on the associated screw 16' in the transverse direction thereof.

In a modification of the embodiment of FIGS. 5 to 7 the screws 44 are dispensed with and the elements 10 and 11 are permanently clamped against each other by injecting a setting adhesive in the gap provided between each screw 16' and the inside wall of the bore 15' receiving the screw 16' while the elements are being clamped by an external pressure in order to engage the balls 39' between the races formed by the grooves 43 and the surface 42. When the adhesive has set, the external pressure is relieved, the screws 16' thus being fixed in such a position in the associated bores 15' that the bias previously provided by the external pressure will be maintained between the elements. In this position the screw 16' may be coaxial with the bore 15' or it may be displaced more or less in the transverse direction upwards or downwards. The set adhesive filling the clearance between the screw and the inside surface of the bore will maintain the screw in said position.

Figure 8:
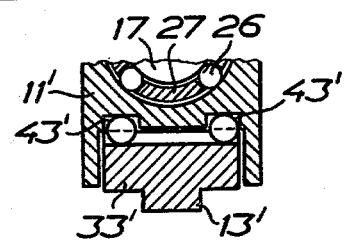
FIGS. 8 to 10 are fragmentary cross-sectional views similar to that in FIG. 7 of modified embodiments of the anti-friction bearing of the device in FIG. 5.

The V-formed grooves in FIGS. 5 to 7 can be replaced by grooves 43' having rectangular cross-sectional form as is shown in FIG. 8, the same operation being obtained as in FIGS. 5 to 7 with the only exception that the ball has a 2-point engagement between the elements instead of a 3-point engagement.

Figure 9:
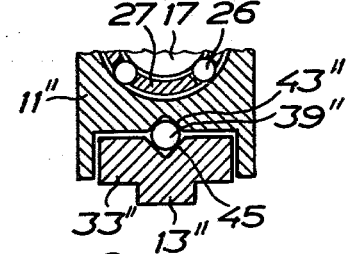

FIG. 9 discloses an embodiment having a single ball race which can be located centrally or eccentrically, the ball 39''' being received by a V-shaped groove 43''' in the element 11''' and in a corresponding V-shaped groove 45 in the web 33''' of the element 13'''.

Figure 10:
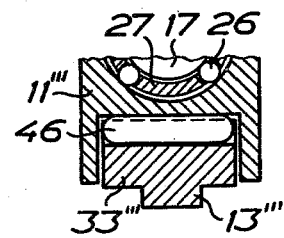

Finally, FIG. 10 discloses a device wherein the ball 39 is replaced by a roller 46 engaging plane surfaces on the stem of the element 11''' and the web 33''' of the element 13'''.

It is possible according to the invention to use many other ball arrangments than those shown herein adapted to the load and size as well as the stroke desired between the elements 10 and 11. In the ball cage 27 several circular sets of balls 26 can be arranged, the balls of one set being displaced circumferentially in relation to adjacent sets in order to obtain a distribution of the ball pressure. Also the balls 39 and the rollers 46, respectively, can be arranged in different numbers, not only one or two as shown herein, depending on the desired load and/or stroke. The balls 26 and 39 as well as the rollers 46, moreover, can be arranged in endless paths in a known manner, these paths extending in a ball socket or through channels in the elements 10 and/or 11. It is also possible to form the body 17 with screw grooves and to arrange this body as a rotatable screw spindle engaging by means of an endless series of balls a nut non-rotatably secured in the element 11 so that the elements can be displaced in relation to each other by rotating the body (screw spindle) 17.

It may be preferred to extend the element 11 over the limbs of the element 10 as is shown in FIG. 6 in order to form thereby a seal 47 of the labyrinth type between the ball space and the surroundings in order to prevent e.g. filings or the like from penetrating into this space.

I claim:

1. A device for providing linear measuring motion comprising:

a U-shaped element and a T-shaped element, the stem of the T-shaped element being received between the limbs of the U-shaped element, so that said elements are relatively displaceable with respect to one another, so as to provide said linear measuring motion;

a body fixedly connected to said U-shaped element and received in a cylindrical opening extending through the stem of the T-shaped element;

the T-shaped element being mounted to said body by ball bearing means for allowing relative axial motion of said stem of the T-shaped element between the limbs of said U-shaped element and rotational motion of said T-shaped element about said body; and means for preventing said rotational motion and ensuring accurate guidance of said elements during relative axial displacement thereof, comprising anti-friction bearing means disposed on at least one axial race between said T-shaped element and said U-shaped element.

2. A device, according to claim 1, wherein said at least one race has a support fixedly secured to one of said elements.

3. A device, according to claim 2, wherein said support and said anti-friction bearing means are disposed in a transverse opening, elongated in the axial direction, and located in said one of said elements.

4. A device, according to claim 1, wherein said anti-friction bearing means is disposed between a plane race on one of said elements and a race formed by a groove in the other of said elements.

5. A device, according to claim 4, wherein said antifriction bearing means comprises a ball and said groove is V-shaped.

6. A device, according to claim 1, wherein said antifriction bearing means comprises a ball received in V-shaped grooves disposed in both of said elements.

7. A device, according to claim 1, further including means for biasing said elements towards each other longitudinally along said at least one axial race.

* * * * *